May 29, 1928.  1,671,613
E. N. ROTH
HOSE COUPLER
Filed July 19, 1926   2 Sheets-Sheet 1
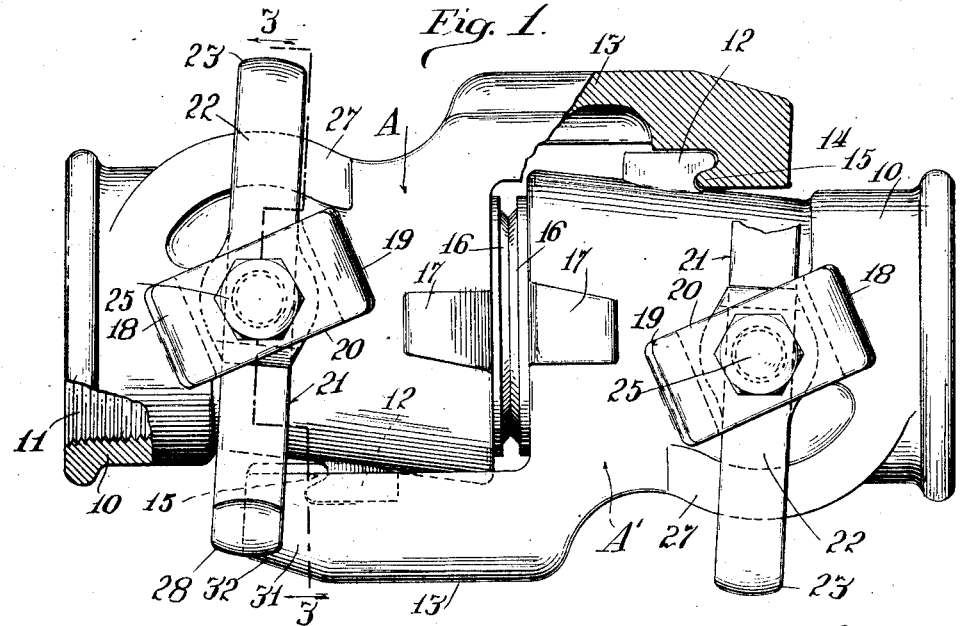
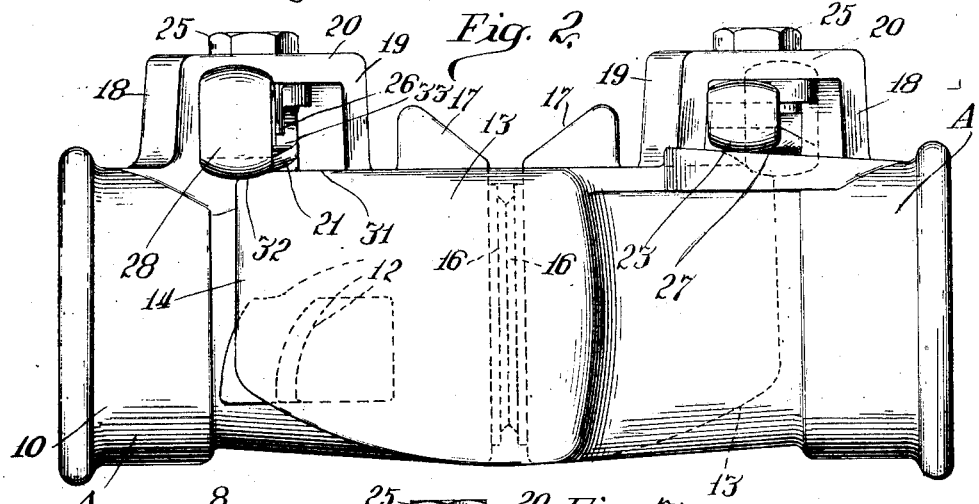
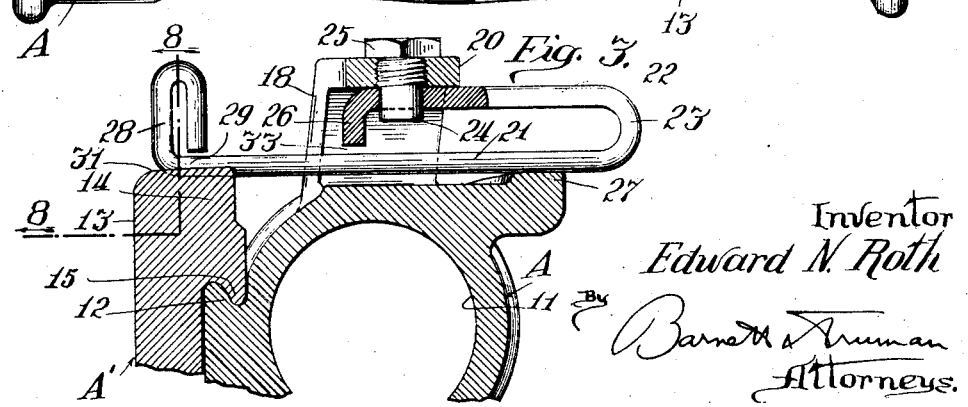
Inventor
Edward N. Roth

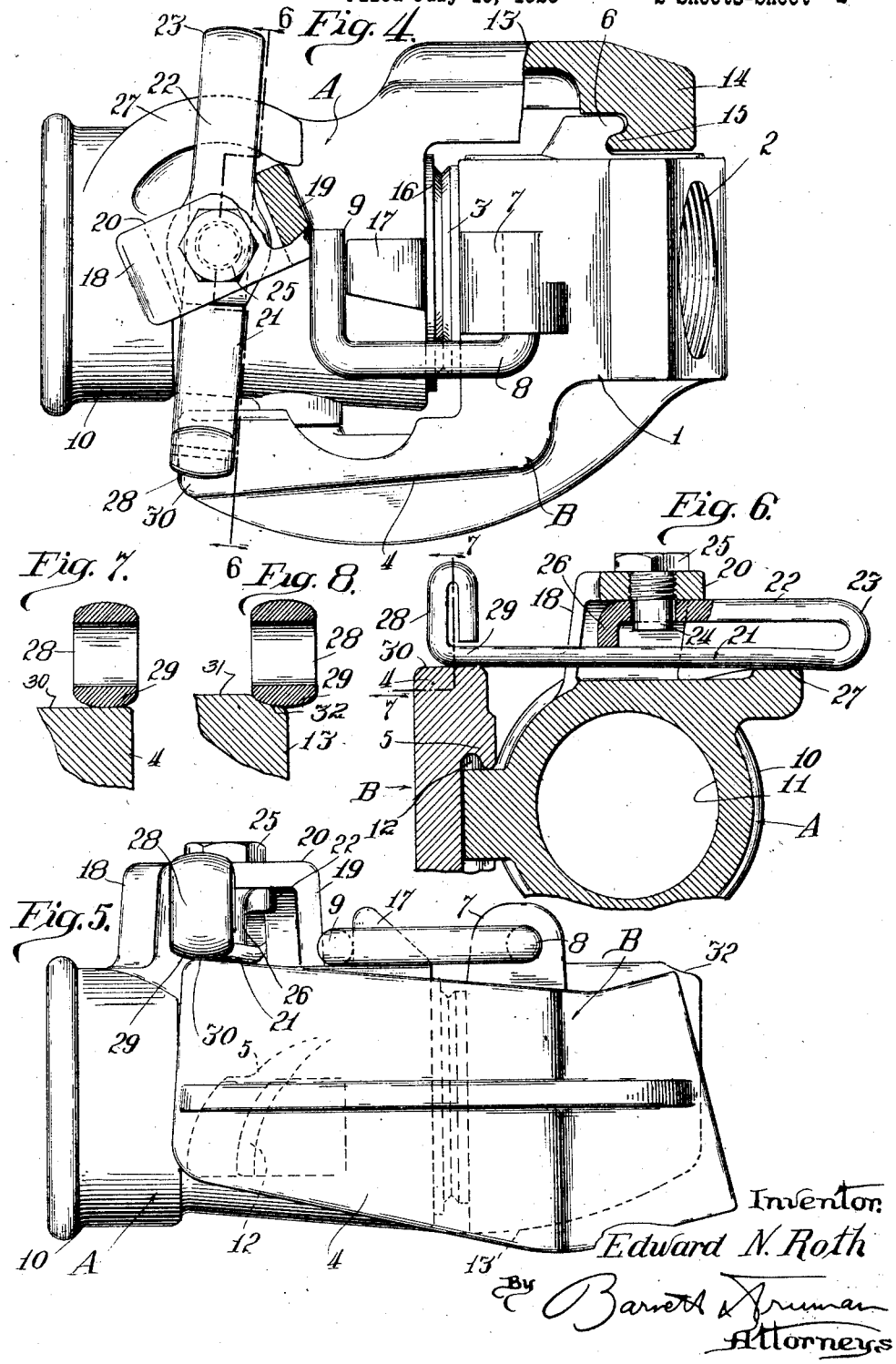

Patented May 29, 1928.

1,671,613

UNITED STATES PATENT OFFICE.

EDWARD N. ROTH, OF CHICAGO, ILLINOIS, ASSIGNOR TO ROTH MANUFACTURING COMPANY, OF CHICAGO, ILLINOIS, A CORPORATION OF ILLINOIS.

HOSE COUPLER.

Application filed July 19, 1926. Serial No. 123,354.

This invention relates to hose couplings for connecting together the hose or equivalent flexible metallic structures on the train pipes, steam or air, of railway cars; and relates more particularly to new and improved means for locking together the couplers or mating members of the coupling.

It has been customary to provide couplers with locking devices of one sort or another, which are forced with wedging pressure against the arms of the mating couplers, to hold the couplers in locked relation as against the tendency to be rocked on their cams and disengaged by pull on the hose, when the train rounds a curve, for example. These positive wedge locks are effective so far as this purpose is concerned, but the wedging pressure, especially as the locks are frequently driven into place by a hammer, is likely to injure the gaskets and also to strain or bend the coupler arms and mutilate the cams. A primary object of my invention is to provide a wedge lock which will yield, so that injury to the couplers and gasket is prevented and the efficiency of the lock increased, and its manipulation made easier. This object is accomplished in brief, by making the locking bar of spring metal, bent to a peculiar form, so that it will yield within certain limits, and at certain times in the locking operation, to avoid undue strain on the coupler parts.

Another object is to provide a locking means which is impositive when in fully locked position, that is, will normally hold the parts securely locked together, but will yield sufficiently under excessively abnormal bending strains to permit the locking members to be completely disengaged.

Another object is to provide this improved locking means on an improved coupler head, the combination being so designed that they may not only be used with a mating coupler of similar design, but will also effectively cooperate with a mating coupler head of the old standard design.

Other objects and advantages of this invention will be more apparent from the following detailed description of one approved embodiment of the invention.

In the accompanying drawings:

Fig. 1 is a plan view of a pair of mated hose couplers constructed in accordance with this invention.

Fig. 2 is a side elevation of the assembly shown in Fig. 1.

Fig. 3 is a transverse vertical section, taken substantially on the line 3—3 of Fig. 1.

Fig. 4 is a view similar to Fig. 1, but showing one of the improved couplers and locking means, mated with a coupler of old and standard design.

Fig. 5 is a side elevation of the assembly shown in Fig. 4.

Fig. 6 is a transverse vertical section taken substantially on the line 6—6 of Fig. 4.

Fig. 7 is a detail sectional view taken substantially on the line 7—7 of Fig. 6.

Fig. 8 is a similar sectional view taken substantially on the line 8—8 of Fig. 3.

Referring now to the drawings, in Fig. 4 is shown an improved type of coupler A, provided with the improved locking device, this coupler being here used in mating relation with a coupler B of known type. In Fig. 1 the improved coupler A is shown in mating relation with another improved coupler A', the couplers A and A' being substantially identical in all respects. The coupler and locking means of this invention are designed so that they will mate with any of the different types of so-called gravity hose couplers now in use on steam railroads in this country, for making the connection between the steam train pipes on adjacent cars of railway trains, the coupler B here shown being typical or illustrative of couplers of this general class of which there are several different makes. Coupler B consists of a head 1 formed with the steam port 2, in which is arranged a gasket 3, the head having a forwardly projecting arm 4 provided with an undercut lug or so-called cam 5, and the other side of the head from the arm 4 is provided with a cam lug 6. The lug 6 is adapted to be engaged by the cam lug 5 of a mating coupler, when two of the standard couplers B are joined together. Projecting upwardly from the top of head 1 is a lug 7 in which is pivoted a locking link 8, the angularly disposed end 9 of which is adapted to engage with a lug on the mating coupler corresponding to lug 7.

The improved coupler A comprises a head 10, formed with a steam port 11, and on one side is the usual undercut lug or cam 12 (similar to lug 6 already described), adapted to be engaged by the cam 5 of coupler B.

The projecting arm of coupler A consists of a curved or concavo-convex web 13 terminating in a thickened portion 14 provided with a cam 15 for engagement with the cam 6 on the head of coupler B, or with the cam 12 on one of the improved coupler heads as shown at A' in Fig. 1. A gasket 16 is suitably arranged in a gasket seat at the outer end of port 11. The novel features of this coupler A just referred to, are not claimed specifically herein, as they are the invention of and are claimed in an application of Egbert H. Gold and Edward A. Russell, Serial No. 117,431, filed June 21, 1926. The coupler A may be provided with an upstanding lug 17 adapted to be engaged by the locking link 8 of a coupler such as B. When two of the improved couplers A are mated, as shown in Fig. 1, the lugs 17 are not used.

Each coupler A is provided with one of the improved locking devices forming the particular subject-matter of this invention. Arranged diagonally on the top of and preferably cast integral with the head 10, is a housing or bracket consisting of upright members 18 and 19, and a connecting member 20. The locking bar 21 is preferably made of steel so as to be somewhat resilient, and is preferably of a "half-round" section, (as best shown in Figs. 7 and 8), for reasons hereinafter apparent. One end portion 22 of the bar is bent back on itself as at 23, and this return bent portion 22 is pivoted near its end on the pivot pin 24 formed on the lower end of stud 25, screwed into the cross member 20 of the bracket. The free end of the upper leaf 22 of the locking bar is bent downwardly to form a lug or projection 26 which, under certain conditions, as hereinafter described, engages an intermediate portion of the lower leaf 21 of the locking bar. The return bent portion 23 of the locking bar bears upon an arcuate wedge surface 27, which is preferably formed on the top of the head 10, substantially concentric with the axis of pivot pin 24. The opposite free end of the lower leaf 21 of the locking bar is preferably looped over as shown at 28 to form a suitable head for engagement by a hammer or other tool for forcing the locking bar into or out of locking position. This free end portion 29 of the locking bar is adapted to bear upon the upper surface of the arm of the mating coupler, for example, upon the surface 30 of arm 4 of coupler B, as shown in Figs. 4 to 7 inclusive. The upper surface 31 of the projecting arm 13 of coupler A is formed at its end with a quarter-round locking recess 32, adapted to be engaged by the free end portion 29 of the locking bar, as shown in Figs. 1, 2, 3 and 8. It is for this reason that the locking bar is preferably formed of half-round steel section, although if desired, only the end portion of the locking bar, as shown at 29, need be formed of this half-round section, the remainder of the bar being of any desired or convenient cross section.

When one of the improved couplers A is mated with a standard coupler B, as shown in Figs. 4, 5, 6 and 7, the locking bar 21 is rotated, for example, by striking the head 28 with a hammer, and the return bent end 23 rides up the wedge surface 27, thus forcing the free end 29 of the locking bar downwardly so that it exerts a pressure on the arm 4 of the mating coupler. During the first portion of this engagement the locking bar will yield, throughout its length, to permit the parts to become properly adjusted without danger of the gasket being crushed or the coupler arm bent. After the first part of the engagement takes place, the lower leaf 21 of the locking bar will be brought up into contact with the lug 26 on the upper leaf, and after this the locking member will act as a substantially rigid bar except for the resilience in the short free end of lower leaf 21 beyond the lug 26, and the resilience in the return bent end portion 23. In this final position the locking bar will be substantially stiff, but will be capable of yielding sufficiently to prevent damaging the gaskets or the coupler arm in case the locking bar is driven too far, or too violently into locking position.

When two of the improved couplers A are mated with one another, as illustrated in Figs. 1, 2, 3 and 7, the first part of the coupling and locking operations will be substantially the same as already described in connection with the coupler B. However, in this case, when the locking bar is driven completely into locking position (its movement in this direction being limited by the engagement of lower leaf 21 with the upright 18 of the bracket), the end 29 of the locking bar will snap down into the locking recess 32 in the upper end portion of projecting arm 13. At this time, the lower leaf 21 of the locking bar will spring away, as indicated at 33, from the lug 26, so that the full resiliency of the locking bar is again active, although the parts are securely held in locked position by the engagement of the locking bar within the recess 32. The locking bar will now yield upwardly in response to unusual bending or tilting strains between the two coupling members, and if this bending strain should go beyond a certain maximum, the arm 13 will snap upwardly past the locking bar, the end of the locking bar passing out of the open end of locking recess 32 and the members becoming entirely disengaged. Thus the lock is not positive, but will yield under excessively abnormal strains before any breakage or injury to the parts take place. It will be seen that the lock is a positive one, although yielding, when the improved coupler A is engaged with a standard coupler B, and is also positive but yielding when two couplers A are engaged but the locking bar is not driven completely home. However, if the locking bar is driven to its limit so that it engages in the locking recess 32, the lock becomes impositive, so that it will permit disengagement of the member under excessive bending strains. The lock is, however, sufficiently positive to hold the parts securely in locked position under all normal conditions.

I claim:

1. In combination, a pair of mating hose couplers each comprising a head and a projecting arm, a yielding locking bar pivotally mounted on the head of one coupler, and a locking recess formed in the other coupler the locking bar being adapted to seat in the recess when rotated to an extreme position in one direction, and means to limit the rotation of the bar in this direction.

2. In combination a hose coupler, and a rounded locking bar formed of spring metal pivotally mounted on the coupler and adapted when swung about its pivot to locking position to yieldingly engage a locking recess in a mating coupler.

3. A hose coupler comprising a head and a projecting arm provided with cams to engage, respectively, cams on the arm and head of a mating coupler, the arm having a locking recess adjacent the end thereof, and a resilient metal locking member revolubly supported on the head of the coupler so that when swung about its pivot to locking position one end thereof may yieldingly engage the recess in the arm of the mating coupler.

4. A hose coupler comprising a head having a wedge surface and a projecting arm provided with a locking recess adjacent its end, the head and arm provided with cams adapted to engage respectively with cams on the arm and head of a mating coupler, and a locking member revolubly supported on the head and adapted to yieldingly engage the wedge surface and the recess in the arm of the mating coupler.

5. A hose coupler comprising a head having a wedge surface and a projecting arm provided with a locking recess adjacent its end, the head and arm provided with cams adapted to engage respectively with cams on the arm and head of a mating coupler, and a locking member revolubly supported on the head, one arm of the locking member engaging the wedge surface and the other arm yieldingly engaging the recess in the arm of the mating coupler.

6. A hose coupler comprising a head having a wedge surface and a projecting arm provided with a locking recess adjacent its end, the head and arm provided with cams adapted to engage respectively with cams on the arm and head of a mating coupler, and a resilient metal locking member revolubly supported on the head so that one end thereof engages the wedge surface and the other end engages in the recess in the arm of the mating coupler.

7. In combination a coupler comprising a head and a projecting arm provided with cams adapted to engage cams on the arm and head of a mating coupler, the arm having a rounded recess in the end portion thereof, an arcuate wedging surface on the head, a bracket on the head, and a resilient locking member pivoted in the bracket and adapted to engage the wedging surface and having a rounded projecting portion adapted to yieldingly engage in the recess in the arm of the mating coupler.

8. In combination a coupler comprising a head and a projecting arm provided with cams adapted to engage cams on the arm and head of a mating coupler, the arm having a rounded recess in the end portion thereof, an arcuate wedging surface on the head, a bracket on the head, and a resilient locking member intermediately pivoted in the bracket and adapted to bear at one end on the wedging surface, the other rounded end of the locking member engaging in the recess in the arm of the mating coupler.

9. In combination a coupler comprising a head and a projecting arm provided with cams adapted to engage cams on the arm and head of a mating coupler, the arm having a rounded recess in the end portion thereof, an arcuate wedging surface on the head, a bracket on the head, and a resilient return bent locking bar, the return bent portion being pivoted in the bracket and bearing upon the wedging surface, and the free end of the bar being rounded and engaging the recess in the arm of the mating coupler.

10. In combination a coupler comprising a head and a projecting arm provided with cams adapted to engage cams on the arm and head of a mating coupler, the arm having a rounded recess in the end portion thereof, an arcuate wedging surface on the head, a bracket on the head, and a resilient return bent locking bar, the upper leaf of which is pivoted in the bracket, the return bent portion engaging the wedging surface, and the free end of the lower leaf being rounded and engaging yieldingly in the recess in the arm of the mating coupler.

11. In combination a coupler comprising a head and a projecting arm provided with cams adapted to engage cams on the arm and head of a mating coupler, the arm having a locking recess in the end portion thereof, an arcuate wedging surface on the head, a bracket on the head, and a resilient locking bar pivoted in the bracket and having a portion bearing on the wedging surface and an end portion adapted to yieldingly seat in the recess.

12. In combination a coupler comprising a head and a projecting arm provided with cams adapted to engage cams on the arm and head of a mating coupler, the arm having a locking recess in the end portion thereof, an arcuate wedging surface on the head, a bracket on the head, and a resilient locking bar pivoted in the bracket and having a portion bearing on the wedging surface and an end portion adapted to yieldingly seat in the recess, the bracket limiting the movement of the locking bar in one direction to prevent the bar passing out of the recess unless it is sprung upwardly by an abnormal stress.

13. A hose coupler comprising a head having a wedge surface and a projecting arm, the head and arm provided with cams adapted to engage respectively with cams on the arm and head of a mating coupler, and a resilient metal locking member intermediately pivoted on the head, one end of the member adapted to engage the wedge surface, and the other end adapted to yieldingly engage the upper edge of the end of the arm of the mating coupler, whereby under excessive stress the locking member will yield upwardly and become disengaged from the arm by snapping over the end thereof.

14. A hose coupler comprising a head having a wedge surface and a projecting arm, the head and arm provided with cams adapted to engage respectively with cams on the arm and head of a mating coupler, and a resilient metal locking member intermediately pivoted on the head, and adapted to swing to locking position in such a direction that one end thereof will ride up the wedge and the other end will move along the arm of the mating coupler to a locking position above the upper edge of the end thereof, there being a stop on the head for limiting further swinging movement of the locking member in this direction, the locking member being adapted to yield upwardly under excessive stress and become disengaged from the arm of the mating coupler by snapping over the end thereof.

15. A hose coupler comprising a head and a projecting arm, the head and arm provided with cams adapted to engage respectively with cams on the arm and head of a mating coupler, and a resilient metal locking member pivoted on the head and adapted to swing to locking position in such a direction that one end thereof will move along the arm of the mating coupler to a locking position above the upper edge of the end thereof, there being a stop on the head for limiting further swinging movement of the locking member in this direction, the locking member being adapted to yield upwardly under excessive stress and become disengaged from the arm of the mating coupler by snapping over the end thereof.

EDWARD N. ROTH.